(12) United States Patent
Kawahara et al.

(10) Patent No.: US 10,699,064 B2
(45) Date of Patent: Jun. 30, 2020

(54) TEXT INPUT COCKPIT

(71) Applicant: Microsoft Technology Licensing, LLC, Redmond, WA (US)

(72) Inventors: Takanori Kawahara, Hon-komagome (JP); Masaru Iritani, Setagaya (JP); Taketoshi Yoshida, Shibuya (JP)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 15/499,633

(22) Filed: Apr. 27, 2017

(65) Prior Publication Data

US 2018/0314419 A1    Nov. 1, 2018

(51) Int. Cl.
  *G06F 3/14*     (2006.01)
  *G06F 40/166*   (2020.01)
  *G06F 3/023*    (2006.01)
  *G06F 40/274*   (2020.01)

(52) U.S. Cl.
  CPC .......... *G06F 40/166* (2020.01); *G06F 3/0237* (2013.01); *G06F 40/274* (2020.01)

(58) Field of Classification Search
  USPC ......... 715/765; 707/706, 710, 742; 705/7.32
  See application file for complete search history.

(56) References Cited

U.S. PATENT DOCUMENTS

| | | | |
|---|---|---|---|
| 2010/0161594 A1 | 6/2010 | Prasad et al. | |
| 2011/0265031 A1 | 10/2011 | Chiu et al. | |
| 2012/0124072 A1 | 5/2012 | Vaidyanathan et al. | |
| 2012/0246165 A1 | 9/2012 | Batraski et al. | |
| 2012/0296888 A1 | 11/2012 | Anthony et al. | |
| 2013/0212099 A1 | 8/2013 | Dellinger et al. | |
| 2013/0325832 A1 | 12/2013 | French et al. | |
| 2013/0346872 A1 | 12/2013 | Scott et al. | |
| 2014/0149372 A1* | 5/2014 | Sankar | H04L 12/1813 707/706 |
| 2014/0189572 A1 | 7/2014 | Martens et al. | |
| 2014/0244619 A1 | 8/2014 | Doroshenko | |

(Continued)

OTHER PUBLICATIONS

Hearst, Marti A., "User Interfaces for Search", In Publication of Addison Wesley, 2011, pp. 1-54.

*Primary Examiner* — Ruay Ho
(74) *Attorney, Agent, or Firm* — Schwegman Lundberg & Woessner, P.A.

(57) ABSTRACT

Methods, systems, and computer programs are presented for providing text input options in a user interface to accelerate data entry and provide contextual information. One method includes an operation for detecting presence of an application in a user interface, the application configured to receive text input from a user. The method also includes providing in the user interface an input cockpit based on the detected application. The input cockpit includes at least one information panel and at least one input panel. The method further includes operations for determining a history context based on text input entered by the user for the application, and for performing a search based on the history context and presenting one or more results from the search in the at least one information panel. The method further includes an operation for providing text shortcuts in the at least one input panel based on the history context.

21 Claims, 12 Drawing Sheets

(56) References Cited

U.S. PATENT DOCUMENTS

| | | | |
|---|---|---|---|
| 2015/0006505 A1* | 1/2015 | Plakhov | G06F 16/3328 |
| | | | 707/710 |
| 2015/0269250 A1* | 9/2015 | Basovnik | G06F 16/319 |
| | | | 707/742 |
| 2015/0363802 A1* | 12/2015 | Varian | G06Q 30/0203 |
| | | | 705/7.32 |
| 2016/0034170 A1 | 2/2016 | Gallup et al. | |
| 2016/0092565 A1 | 3/2016 | Mckenna et al. | |
| 2017/0277396 A1* | 9/2017 | Chung | G06F 3/04817 |

\* cited by examiner

FIG. 1A

Clipboard (106):
- Apple Watch
- Android 6.0
- Acura
- http://tabelog.com...
- Taco meter
- Multi-screen display

Phrase (108):
- Thank you
- Good morning
- Sorry for your inco...
- For your information
- It was great to see...
- You are welcome

Prediction (110):
- ☐ Good
- Got
- Going
- Gone
- God 100 chars/mn (112)

Typing History (114, 116):
- ☐ Good morning
- Good afternoon
- Good job
- Going forward
- Got it
- Goodbye

Your Contacts (118):
- Takanori Smith (GANZO)
  <takanors@corp1.com>
  02-9999-5432/090-1234-5678
- Masaru Jones
  <majones@corp2.com>
  03-5555-4444/080-3333-2211
- Taketoshi Lopez
  <taketosl@corp3.com>
  03-5555-3232/090-9898-6565

Fig. 1B Clipboard

Apple Watch
Android 6.0
This is the time
Acura
http://tabeloksjl.a...
Taco meter
Multi-screen display

Fig. 1C Phrase

Thank you
Thank you for your...
Good morning
Sorry for your inco...
For your information
It was great to see...
You are welcome

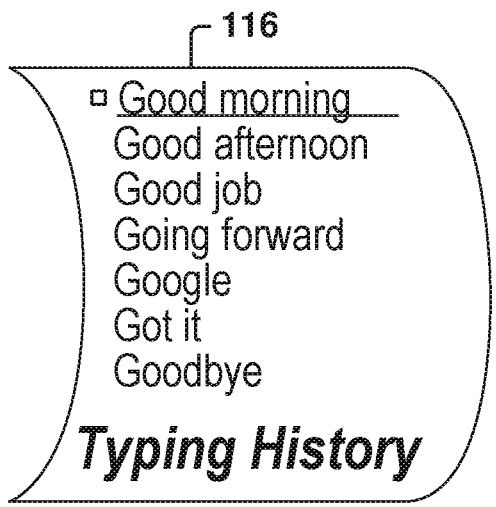

Fig. 1D Typing History

□ Good morning
Good afternoon
Good job
Going forward
Google
Got it
Goodbye

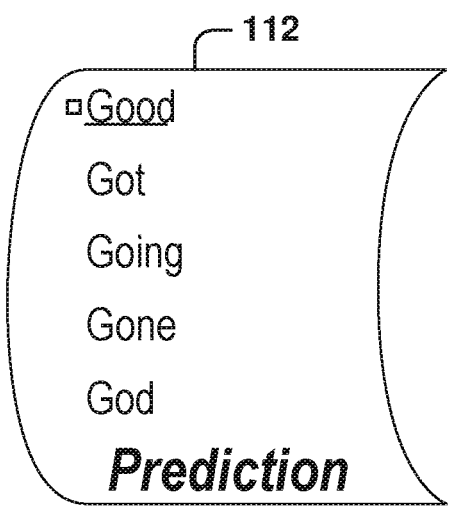

Fig. 1E Prediction

□Good
Got
Going
Gone
God

Fig. 1F Your Contacts

Takanori Smith (GANZO)
<takanors@corp1.com>
02-9999-5432/090-1234-5678 

Masaru Jones
<majones@corp2.com>
03-5555-4444/080-3333-2211 

Taketoshi Lopez
<taketosl@corp3.com>
03-5555-3232/090-9898-6565 

208 — Yakiniku BBQ, UshiGo
www.yakiniku-ushigo.com
Address: 123-456 Minami Gotanda,
Shinagawa-ku, Tokyo
Access 4 minutes' walk from JR-line Gotanda Sta.

FIG. 2B

216 — Godzilla

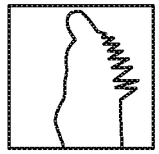

Godzilla is a giant monster originating from a series of tokusatsu films of the same name from Japan. It first appeared in Ishiro Honda's 1954 film Godzilla. Since then, Godzilla has gone on to become a worldwide pop culture icon, appear....

FIG. 2C

TEXT INPUT COCKPIT

TECHNICAL FIELD

The subject matter disclosed herein generally relates to methods, systems, and programs for providing input options in a user interface.

BACKGROUND

Inputting text in a computing system tends to be a slow task, at least when compared to verbal communication. Oftentimes, users wish they could enter text faster, for example when writing a long document or when exchanging text messages with other users.

Sometimes, users utilize electronic keyboards on a touchscreen, but the electronic keyboards are usually slow and prone to mistakes due to the often small surface assigned to each input key. In addition, users sometimes use communications enhancers by including other symbols, such as emojis or small animations. But accessing these additional options is often difficult and requires changing the input mode on the keyboard.

BRIEF DESCRIPTION OF THE DRAWINGS

Various ones of the appended drawings merely illustrate example embodiments of the present disclosure.

FIG. 1A is a schematic of a user interface with a text input cockpit, according to some example embodiments.

FIGS. 1B-1F provide details on the panels of FIG. 1A, according to some example embodiments.

FIGS. 2B-2C provide details on the panels of FIG. 2A, according to some example embodiments.

DETAILED DESCRIPTION

Figure 2A:
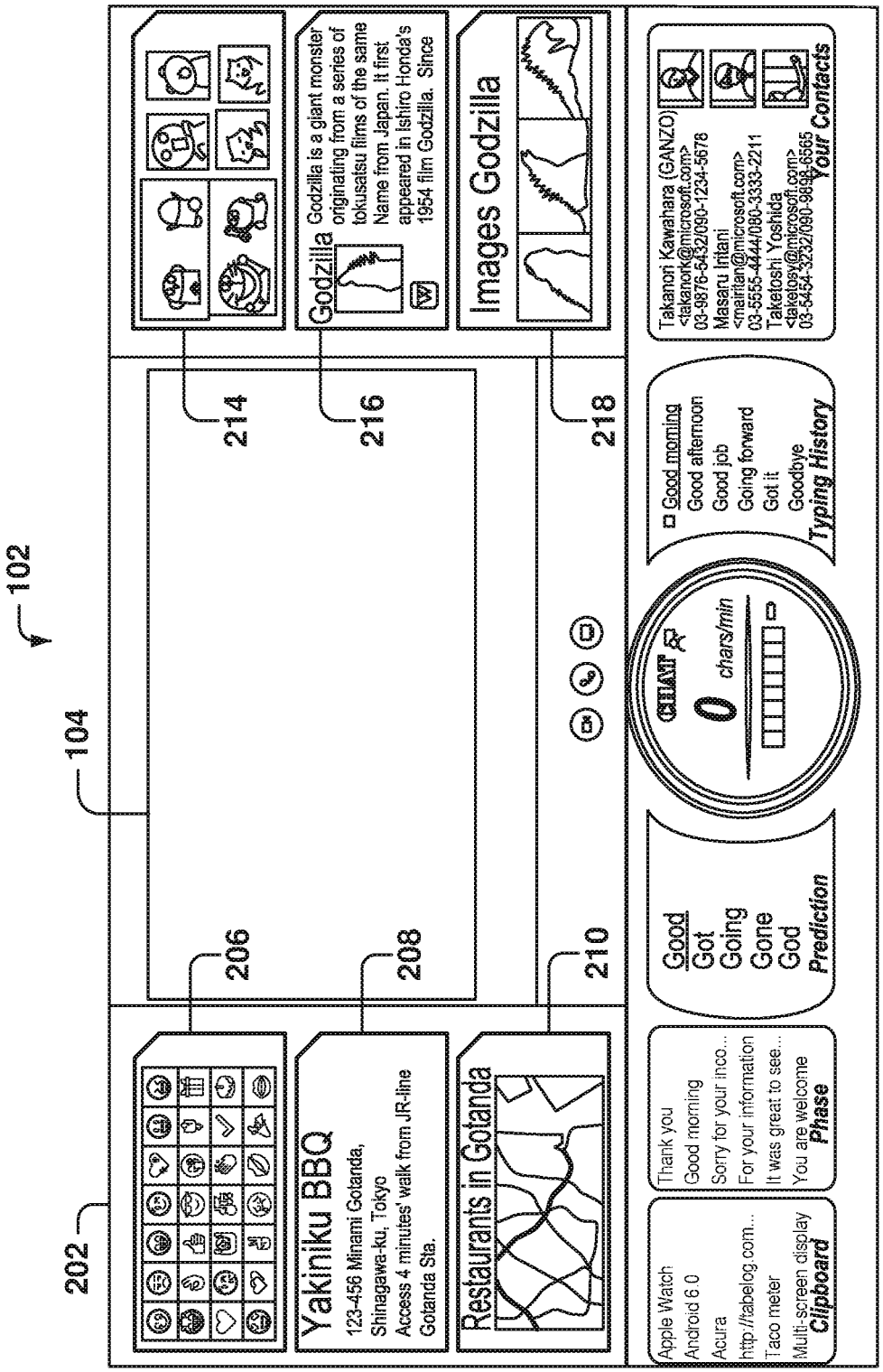
FIG. 2A is a schematic of another mode for the text input cockpit, according to some example embodiments.

Example methods, systems, and computer programs are directed to providing text input options in a user interface to accelerate data entry and to provide contextual information to the user. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Various embodiments improve text input speed using an input hub, referred to as the text input cockpit. The text input cockpit, also referred to herein as input cockpit or simply as cockpit, is presented on a user interface at the same time as an application that is receiving input from the user (e.g., a chat interface or a word editor). The text input cockpit may provide accelerators for entering text, or other types of input, quickly and shows contextual information derived from the activity of the user when interacting with the application.

In some embodiments, the cockpit includes a plurality of panels presented on the user interface, and each panel is a utility that provides input assistance, provides additional input options beyond text, provides contextual information related to the activity of the user, or provides other types of additional information, such as contact information or search results. In some example embodiments, each panel is presented in a separate window in the graphical user interface, but one window may also host a plurality of panels.

The text input cockpit creates a rich input-choice mechanism to provide additional options to the user to communicate with other users or with an application. The panels may provide a variety of commands that enhance the input experience for the user. The cockpit may overlay multiple interfaces on the user interface and accelerates the way the user inputs data into the computer device.

In addition, the cockpit may be customizable and provide an interface so other applications may link to the cockpit and present new utilities within their respective panels. In some example embodiments, an application programming interface (API) is provided to allow third-party applications to take advantage of the utility presented by the cockpit system.

One general aspect includes an example method that includes an operation for detecting, by one or more processors, presence of an application in a user interface, the application being configured to receive text input from a user. The method also includes providing, by the one or more processors, in the user interface, an input cockpit based on the detected application. The input cockpit includes at least one information panel and at least one input panel. The method further includes operations for determining, by the one or more processors, a history context based on text input entered by the user for the application, and for performing, by the one or more processors, a search based on the history context and presenting one or more results from the search in the at least one information panel. The method further includes an operation for providing, by the one or more processors, text shortcuts in the at least one input panel based on the history context.

One general aspect includes an example system including a memory including instructions and one or more computer processors. The instructions, when executed by the one or more computer processors, cause the one or more computer processors to perform operations including: detecting presence of an application in a user interface, the application configured to receive text input from a user; providing, in the user interface, an input cockpit based on the detected application, the input cockpit including at least one information panel and at least one input panel; determining a history context based on text input entered by the user for the application; performing a search based on the history context and presenting one or more results from the search in the at least one information panel; and providing text shortcuts in the at least one input panel based on the history context.

One general aspect includes an example non-transitory machine-readable storage medium including instructions that, when executed by a machine, cause the machine to perform operations including: detecting presence of an application in a user interface, the application configured to receive text input from a user; providing in the user interface an input cockpit based on the detected application, the input cockpit including at least one information panel and at least one input panel; determining a history context based on text input entered by the user for the application; performing a search based on the history context and presenting one or more results from the search in the at least one information panel; and providing text shortcuts in the at least one input panel based on the history context.

FIG. 1A is a schematic of a user interface with a text input cockpit, according to some example embodiments. The user interface 102 includes a windows-based interface, which includes the application window 104 and the text input cockpit 106. It is noted that although the name text input cockpit is used, it is possible to provide other types of inputs besides text (e.g., emojis), and some panels may not be for input but for providing information (e.g., search results for a movie being discussed in a chat communication).

In some example embodiments, the cockpit 106 includes a plurality of panels (e.g., 108, 110, 112, 114, 116, and 118) and each panel provides an input capability or an informational capability. The cockpit 106 presents the panels in the display to assist the user in inputting data to the application 104. The cockpit 106 may have different layouts, which are configurable, such as the layouts presented below with reference to FIGS. 2A and 3.

FIGS. 1B-1F provide details on the panels of FIG. 1A, according to some example embodiments. Returning to FIG. 1A, the layout of the cockpit 106 may change based on the device in which it is used and based on the application 104 being accessed. For example, the layout for a desktop may be different than the layout for a mobile phone, since the mobile phone usually has less display area.

In some example embodiments, the cockpit 106 includes shortcuts that may be associated with a command or an input in one of the panels. The shortcuts may be of different kinds, such as keys from the keyboard (e.g., Ctrl+R, F4, Alt+Shift+A), touch inputs (e.g., selecting an option on a panel using a touchscreen), voice commands, user gestures (e.g., pointing to an option or a panel, waving), an input entered using gaze, a joystick input on a game controller, or some other input mode.

In one example embodiment, the cockpit 106 includes a clipboard panel 108, a phrase panel 110, a word prediction panel 112, a center console 114, a typing history panel 116, and a contact information panel 118. The clipboard panel 108 includes a history of the contents of the clipboard and the user may select one of the entries as an input for the application, as if the user has selected the operation "Paste," although the user may select any of the entries in the clipboard history, and not just the most recent entry.

The phrase panel 110 includes a plurality of phrases that are commonly used and provides a quick accelerator to common phrases. For example, the phrase panel 110 includes an option to enter "Thank you" quickly. This phrase panel 110 is useful for common entries, such as when entering salutations in an email or for activities commonly performed by the user. In some example embodiments, the phrases are based on commonly used phrases among the population of users, and in other embodiments the phrases are based on the commonly used phrases by the user. In yet other embodiments, the phrases might be based on commonly used phrases by the population or by the user.

A configuration option (not shown) allows the user to configure the panel in order to add, modify, prioritize, or delete phrases for inclusion in the phrase panel 110. For example, the user may add a customized signature to be used in letters or emails. It is noted that the phrase may include text, but the phrase may also include other types of data, such as an icon graphic to be included in the signature of the user or a web link to a website.

The prediction panel 112 provides choices for words to be entered based on the word characters already entered. For example, if the user has entered "Go", the prediction panel 112 may offer the options of "Good," "Got," "Going," "Gone," etc.

The center console 114 is a panel that identifies to the user that the cockpit 106 is being utilized. The center console 114 may include a message identifying a mode of the input panel (e.g., chat mode) and other messages, such as the number of characters per minute entered by the user. The center console 114 may simulate a car cockpit or an airplane cockpit where the speed is displayed. Instead of showing the car's speed, the cockpit 106 is about showing the speed of input, ease of use, and access to different input controls.

The typing history panel 116 includes a plurality of words or sentences based on past inputs by the user. Therefore, the typing history panel 116 is customized to the user input patterns. In some example embodiments, the cockpit 106 analyzes the input of the user over a period of time (e.g., a week for six months) to determine what are the common words or sentences used by the user. This information is used to provide suggestions that are more likely to be selected by the user because of past use. For example, a patent attorney may often enter the sentence "In one embodiment," and the typing history panel 116 may offer the suggestion as soon as the user enters the letter "I," the letters "In," or the letters "In o," etc.

If, for example, a shortcut key F5 is reserved for the first option of the typing history panel 116, after the user enters "In" and the typing history panel 116 presents "In one embodiment," if the user presses F5, then "one embodiment" (and a preceding space if needed) will be entered as if the user had typed it.

The contact information panel 118 includes information for one or more contacts (e.g., found in a Contacts application) of the user. The contacts presented are based on context. For example, if the user is in a chat application talking to one or more users, the other users may be shown on the contacts panel 118, or if the name of another user is entered, then the contact information panel 118 may include the user. This way, if the user wants to email, or chat, or communicate with one of the contacts, the user may simply select the respective user and the contact card for that user may be shown in a different window or in the contact information panel 118 itself.

In some example embodiments, the contact information may include options to act upon the users, such as initiating a phone call, a chat conversation, and email, or opening the application 104 that is associated with contacts in the device.

In some example embodiments, the information presented in one or more panels is based on the history context of how the user is entering input for the application 104 or how the user is accessing information provided by the application. For example, in a chat interface, the history context may include the subject or subjects of discussion of the chat, and may include the name of the parties in the chat, a restaurant mentioned in the chat by the user or by another user, a mention to lunch or dinner, the name of a movie or a famous actor, etc. Therefore, the history context considers the input previously entered by the user as well as other inputs or other information presented in the window 104 of the application. The cockpit 106 may analyze the past history of input and outputs of the application 104 to determine one or more subjects that define the history context for presentation of information in one or more panels.

FIG. 2A is a schematic of another mode for the text input cockpit, according to some example embodiments. The cockpit 202 of FIG. 2A may include the same panels as the cockpit 106 in FIG. 1 and additional panels situated on the left and the right of the application window 104. FIGS. 2B-2C provide details on the panels of FIG. 2A, according to some example embodiments.

Returning to FIG. 2A, the cockpit 202 includes the panels previously discussed and an emoji panel 206, a location panel 208, a map panel 210, an animations panel 214, a search panel 216, and an image search panel 218.

The emoji panel 206 includes emojis that may be included in a chat, an email, etc. The emoji panel 206 may include several categories of emojis and the user may select different categories and browse through the emojis available. In some example embodiments, the user may define favorite emojis as a category for quick access, even assigning keyboard shortcuts to commonly used emojis.

The location panel 208 provides information about a place, a business, or an activity based on the history context. For example, if the user is chatting about going to a restaurant for dinner, the location panel 208 provides information about the restaurant, including address, website, menu, etc. In some example embodiments, the calendar of the user is used to obtain history context. If the calendar includes an upcoming appointment to have lunch at a restaurant, the location panel 208 will provide information about the restaurant, even if the user has not entered input related to this restaurant.

In general, the history context may be based on the interactions of the user with the application 104 but also based on the interactions of the user with other applications, such as calendar, email, work website, social media, etc.

The maps panel 210 provides access to a maps application. The location presented on the maps panel 210 is based on the history context. For example, if a restaurant is identified in location panel 208, the maps panel 210 will present a map for the location of the restaurant and other restaurants in the area, and may also include directions from the current location of the user to the restaurant.

The animations panel 214 provides options to enter conversation enhancements, such as animated icons, icons denoting emotion, funny icons, news-related icons, etc.

The search panel 216 performs searches based on the history context and then presents the results of the searches to the user. For example, if the topic of conversation is related to a movie (e.g., Godzilla) or if an appointment of the user includes the name of the movie, a search is made on the movie title to obtain information about the movie. The search results include show times in theaters nearby, a brief description of the subject of the movie, actors in the movie, duration, year released, etc. In addition, the search panel 216 may perform other searches based on the history context, such as based on a topic of conversation. For example, if the topic of conversation is related to politics, the search panel 216 may present political news, or provide information about political actors related to the topic of conversation.

In some example embodiments, the search panel 216 provides search options to the user related to topics in the history context, and if the user selects one of the options, a more detailed search is performed based on the selected option, with the results shown on the search panel 216. In some example embodiments, the search panel 216 may include options to add information in the application window 104. For example, an option may be given to enter the information about the movie in a chat window for sharing with other users. Therefore, the search panel 216 may be used as an information panel or as both an information and input panel.

The image search panel 218 also performs searches related to history context and shows image results. For example, the image search panel 218 may include screen captions of the movie being discussed by the user.

In some example embodiments, the cockpit 202 is an overlay placed on top of the Windows user interface 102, and the content of the user interface underneath the cockpit 202 is not affected by the activation of the cockpit 202. For example, if the cockpit 202 is activated and then deactivated, the area of the user interface 102 occupied by the cockpit does not change because of the activation of the cockpit 202. Further, if the content of the user interface 102 happens to change (e.g., because the content of another window changes) while the cockpit 202 is active, the change in the window will still take place and when the cockpit 202 is deactivated, the window that was covered will show the change as if the cockpit 202 were never activate.

Further, if a web browser window is completely or partially occluded from view by the cockpit 202, the presentation of the web browser would be the same as if the cockpit 202 were not activate. If the web browser is updated dynamically without user input, the web browser will continue to update its contents as if the cockpit 202 was not active.

In another example, the effects of entering a sentence without the cockpit 202 would be the same as if the cockpit 202 were activated, the sentence entered, and then the cockpit 202 deactivated. This means that the cockpit 202 is an overlay for accelerating the input of data, but the cockpit does not alter the normal operation of the Windows user interface 102.

In some example embodiments, if the size of the window 104 is changed, the layout of the cockpit 202 is changed to accommodate the new size, for example, by eliminating panels on one side of the window 104, the panels on both sides, or the panes underneath the window 104. In some example embodiments, the cockpit 202 is automatically turned off if the user initiates any operation to change the size of a window, such as to make the window larger or smaller, or to maximize the window. In other example embodiments, the cockpit 202 may also be turned off automatically when the user presses the Windows key to perform a Windows command.

Figure 3:
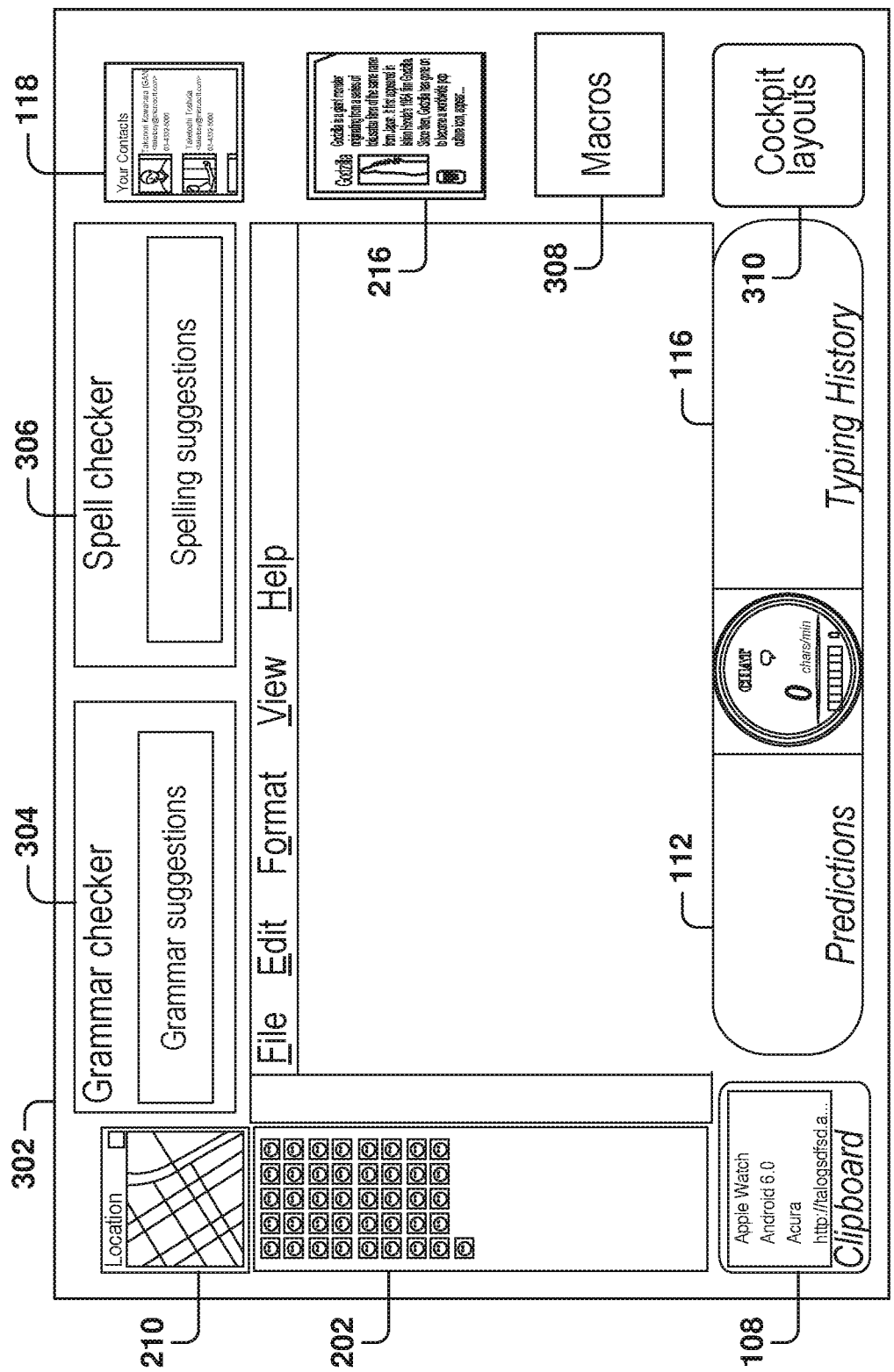
FIG. 3 is a schematic of a cockpit surrounding an application window, according to some example embodiments.

FIG. 3 is a schematic of a text input cockpit surrounding an application window 104, according to some example embodiments. In some example embodiments, predefined layouts for the cockpit are provided and the user may use the predefined layouts, modify the predefined layouts, or create new layouts for the cockpit.

Depending on the application, or applications executing, the layout may take more or less the space on the screen. For example, the predefined layouts may include small, medium, and large configurations depending on the amount of space taken by the cockpit on the user interface, but other categories may also be used.

In some example embodiments, the cockpit 302 includes panels that surround the application window 104. The cockpit 302 includes a grammar checker panel 304, a spell checker panel 306, a macros panel 308, a cockpit layouts panel, and some other panels as previously described with reference to FIGS. 1 and 2.

The grammar checker panel 304 provides suggestions for grammatical corrections as the user types, and the spell checker panel 306 provides spelling suggestions. The macros panel 308 allows the user to record (or program) a serious of operations and save as a macro that may be executed from the macros panel 308. The operations that can be configured in a macro include any of the operations the user may perform while interfacing with the operating system or with any of the applications executing on top of the operating system. For example, the user may define a macro to open an application, such as a calculator tool or a word editor.

The cockpit layouts panel 310 provides options to the user for changing the cockpit layout (e.g., to another predefined or preconfigured layout). In some example embodiments, one or more of the layouts may be associated with shortcut keys in order to quickly change panel layout. One of the shortcut keys may be used to toggle between completely hiding the cockpit 302 or presenting the cockpit 302 on the user interface.

It is noted that the embodiments illustrated in FIGS. 1-3 are examples and do not describe every possible embodiment. Other embodiments may utilize different layouts, panels, combine functionality of two panels in a single panel, etc. The embodiments illustrated in FIGS. 1-3 should therefore not be interpreted to be exclusive or limiting, but rather illustrative.

Figure 4:
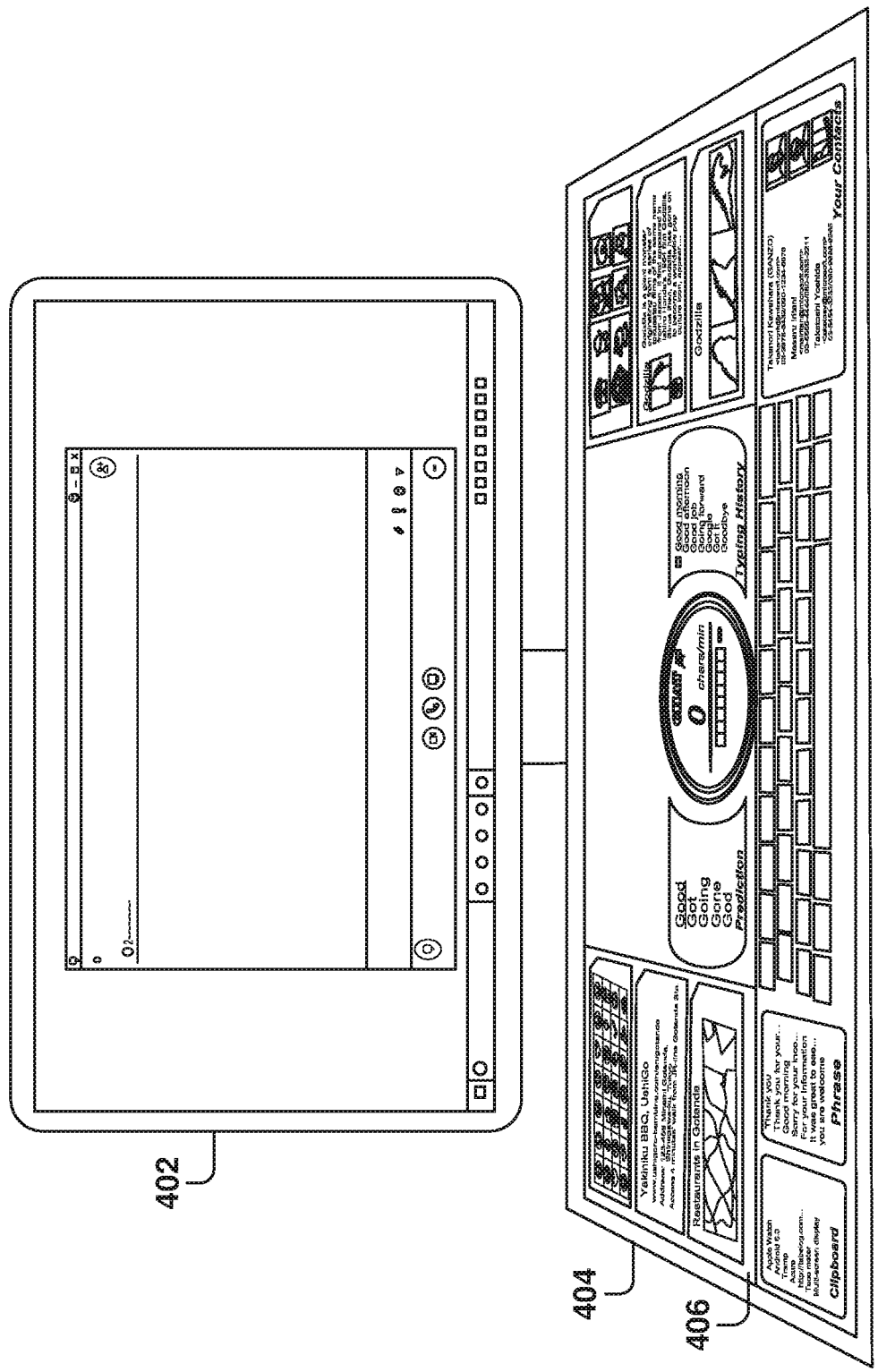
FIG. 4 is a schematic of the cockpit on a touchscreen, according to some example embodiments.

FIG. 4 is a schematic of the cockpit 406 on a touchscreen 404, according to some example embodiments. In some example embodiments, a user may have a touchscreen 404 layout horizontally and a display 402 for the windows interface. The touchscreen 404 may be in any device, such as a touchscreen computer, a tablet, a smartphone, etc.

By having a different display 402, it is possible to provide a cockpit 406 with a large amount of space for presentation of the panels. Further, the cockpit 406 is at the fingertips of the user so all the options (e.g., shortcuts) are easily accessible. In this case, the cockpit 406 further includes a touch keyboard as well as some of the panels previously described.

In some example embodiments (not shown), an accessibility feature is provided with a screen zoom on the text field where input is being entered. The screen zoom centers the text being input on the screen and magnifies it for ease of use and visibility.

In some example embodiments, a panel may be presented for providing foreign language support, such as by providing alternate characters for input, keyword combination translation, or language selection.

Figure 5:
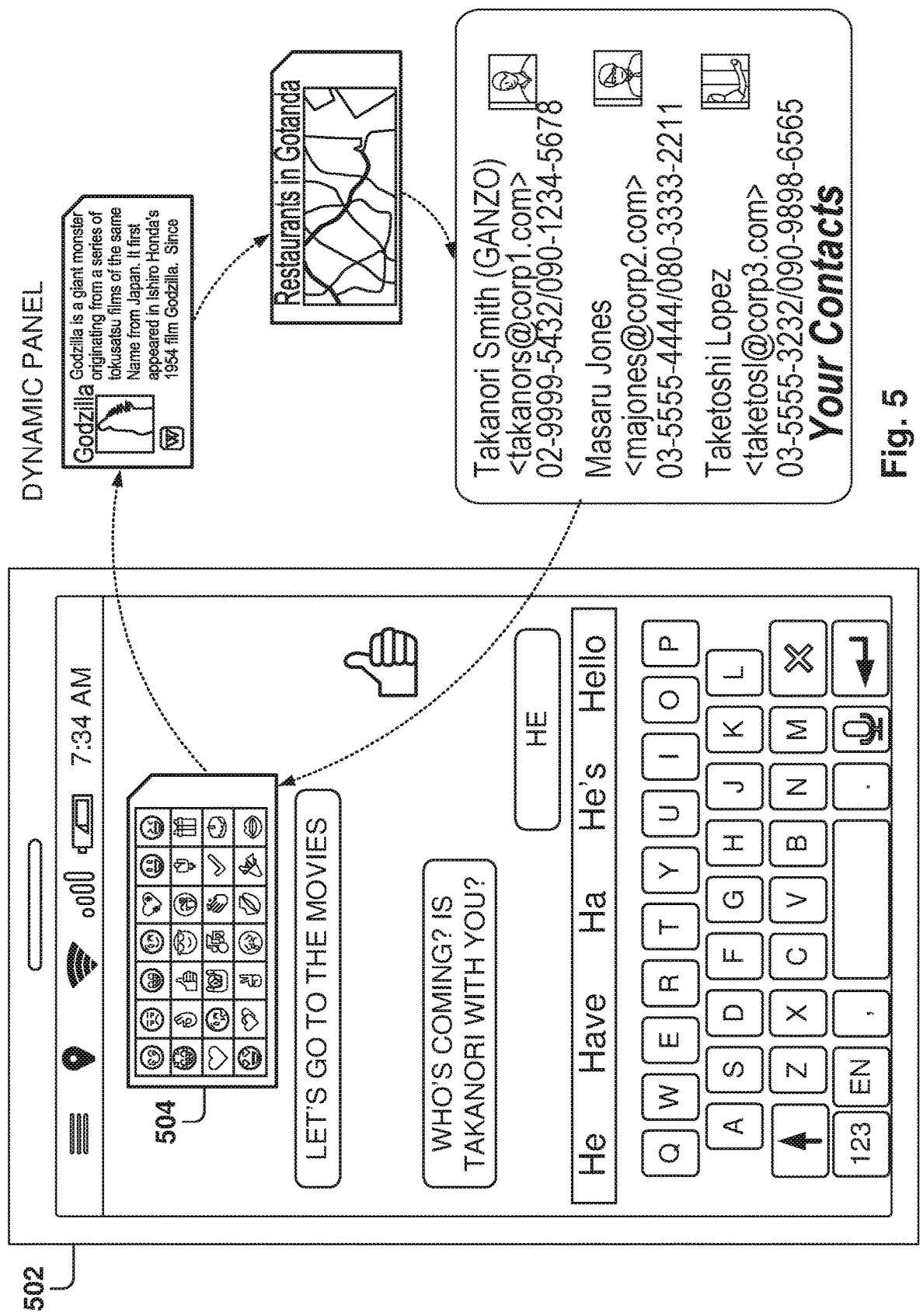
FIG. 5 illustrates a cockpit with a dynamic area that changes the panel based on context, according to some example embodiments.

FIG. 5 illustrates a cockpit with a dynamic area 504 that changes the panel based on context, according to some example embodiments. The cockpit may be presented on devices with small displays, such as the smart phone illustrated in FIG. 5. In some example embodiments, the panels may change dynamically based on user activity.

In one example embodiment, the dynamic area 504 of the user interface is reserved for presenting a panel, but the type of panel changes over time depending on user activity. For example, if the user enters a typo, the spell checker panel 306 may be presented; if the user enters the name of the person, the contacts panel 118 may be presented with the contact information for the person; if the user enters the name of the movie, the search results panel 216 may show information about the movie; if the user enters information about a news topic, the search results panel 216 may show current news about the topic; if the user is chatting, an emojis panel may be presented; etc. This means, that any of the panels described herein may share an area of the cockpit 406 and the panels may be invoked based on context.

In some example embodiments, the cockpit system tracks the user activity and selects the panel to be presented based on the user activity. Further, the cockpit system allows the user to configure which panels to present in the dynamic area and the conditions for selecting the panel. For example, the user may configure "present emojis when starting a new chat," or "do not present the grammar checker while chatting but present the grammar checker while editing a document."

Figure 6:
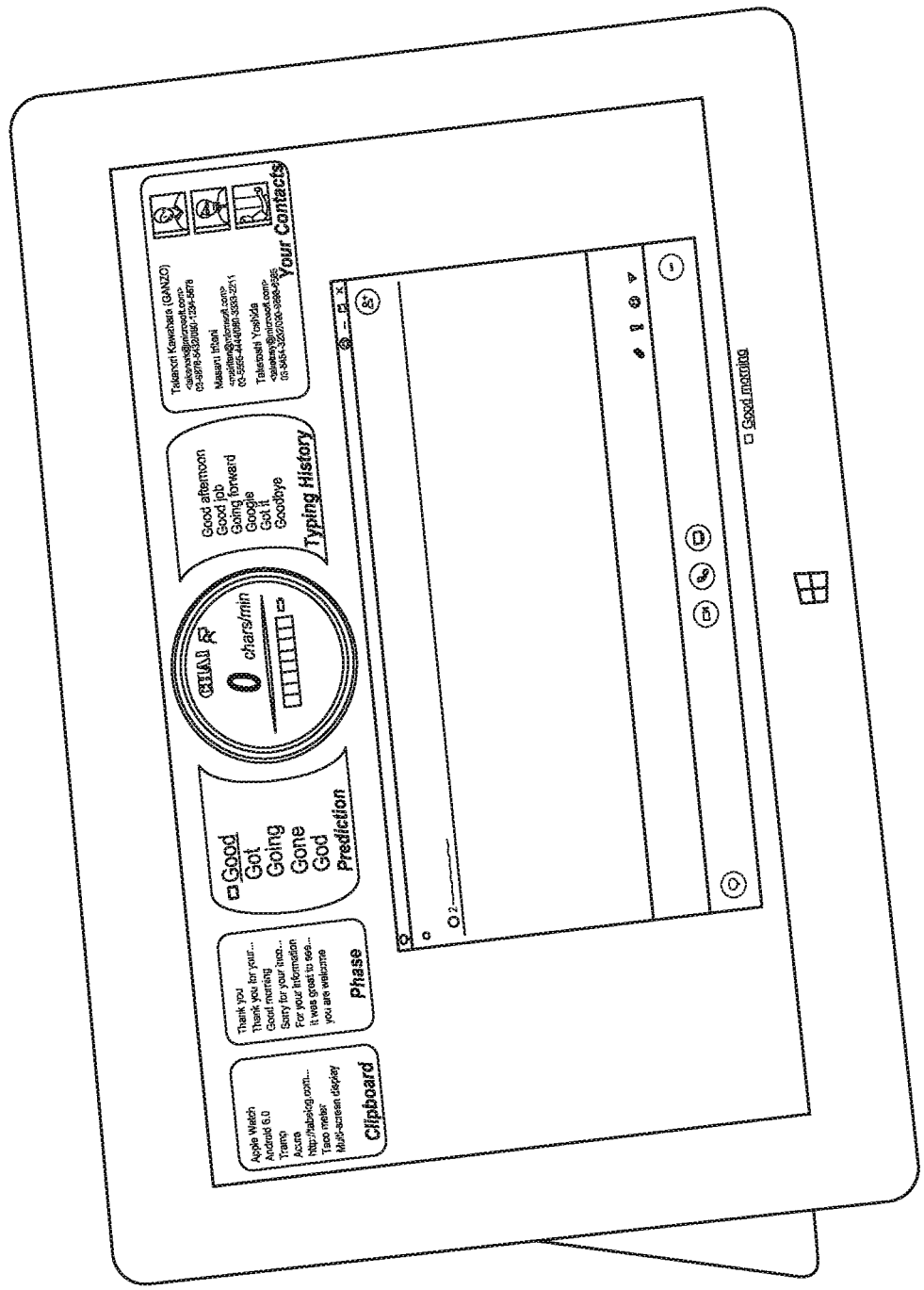
FIG. 6 shows a cockpit on a tablet computing device, according to some example embodiments.

FIG. 6 shows a cockpit on a tablet computing device, according to some example embodiments. In some example embodiments, the cockpit is presented on a device with a touchscreen, such as a tablet. The features available on the panels in the cockpit may be accessed directly via touch, such as selecting a phrase for an input, selecting a word, requested information about a contact, inputting a sticker, opening an application, etc.

Figure 7:
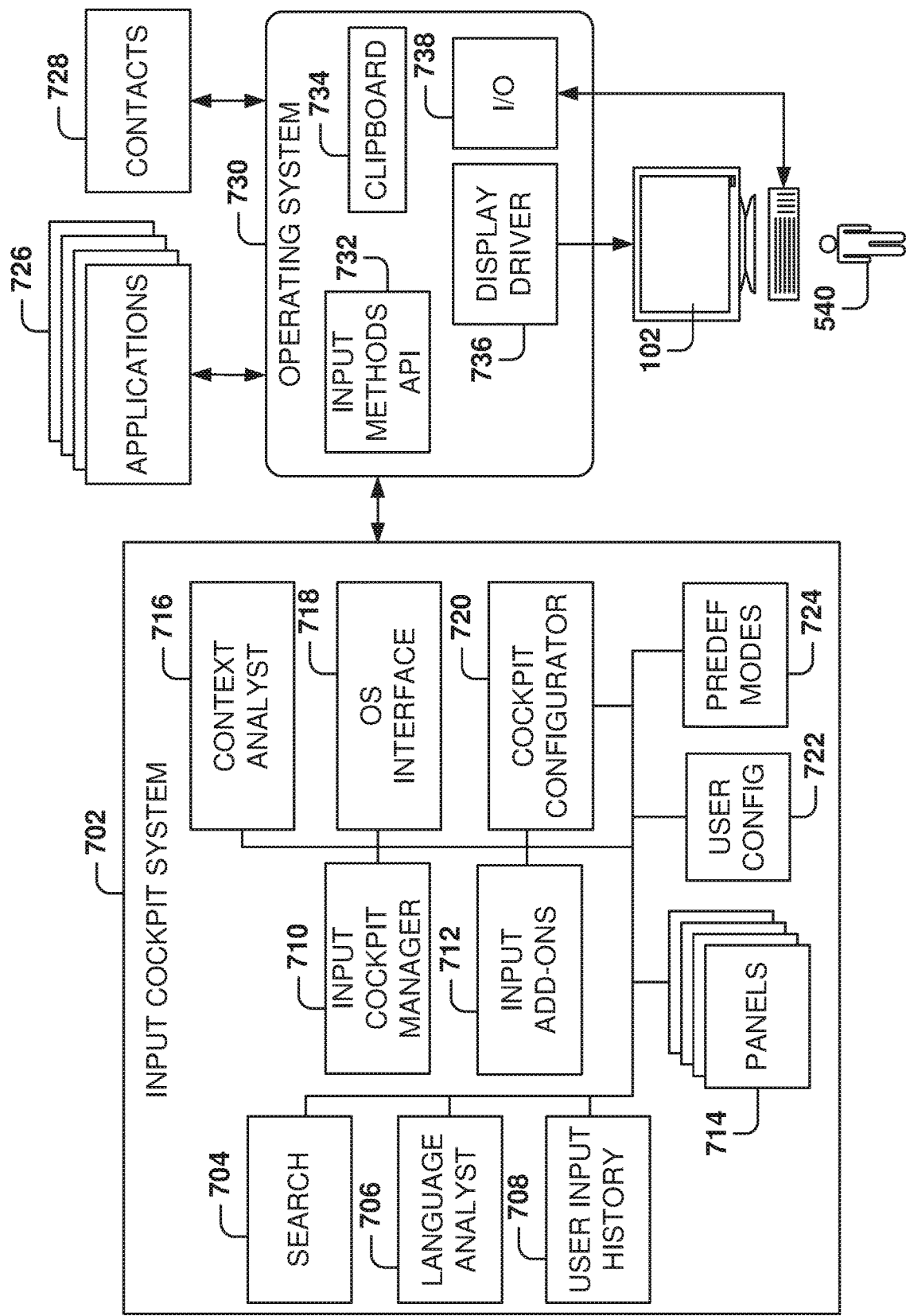
FIG. 7 illustrates an architecture for implementing the input cockpit system, according to some example embodiments.

FIG. 7 illustrates an architecture for implementing the input cockpit system 702, according to some example embodiments. The input cockpit system 702 interfaces with the operating system (OS) 730 of the computer device to incorporate the cockpit user interface 102 on a display 402 of user 740.

In some example embodiments, the cockpit functionality is integrated with the operating system 730 and the cockpit 406 is available for all the applications 726 executing on the device and interfacing with the operating system 730. For example, one of the applications 726 is the contacts application 728, and the cockpit system 702 may also interface with the different applications 726 in order to retrieve data. The input cockpit system 702 may interface with the contacts application 728 to present information in a panel or gather contact information.

In some example embodiments, the input cockpit system 702 includes search 704, language analyst 706, user input history 708, input cockpit manager 710, input add-ons 712, context analyst 716, operating system (OS) interface 718, cockpit configurator 720, panel data 714, user configuration data 722, and predefined modes data 724. The aforementioned components of the input cockpit system 702 may include different configurations. For example, the components may be implemented as software or hardware, may include programs that execute on a processor of a computing device, may include data stored on a memory, or several components may be integrated to execute within a single program. In addition, the components may be implemented in a distributed system and may be executing in different processors executing on one or several computing devices.

The search component 704 performs searches based on a search query. For example, the search query may be constructed based on the history context. The search may be performed on an Internet search engine, or on another service such as Wikipedia® or an internal database of the organization of the user 740.

The language analyst 706 analyzes the text entered by the user 740 and performs grammar checking and spell checking. If errors are found, or suggestions for better writing are provided, the corresponding panel will provide the options to the user 740. The user input history 708 keeps tracks of the text input entered by the user 740 and the input history may be used to provide suggestions for commonly used words or commonly used sentences by the user 740.

The input cockpit manager 710 coordinates activities between the different components of the input cockpit system 702, such as by interfacing with internal or external panels, the OS interface 718, the cockpit configurator 720, etc. In addition, the input cockpit manager 710 manages the user configuration 722 that holds cockpit-related information for the user 740. For example, the user configuration 722 may include panel choices for the user 740, cockpit layouts defined by the user 740, etc.

The input add-ons component 712 provides an interface to create panels in the cockpit 406 by other applications 726. An application 726 that is going to add a panel to the cockpit interfaces with the input add-ons component 712 to create the panel, including panel size, panel data 714, etc. The panels 714 created by outside applications 726 may be created in the cockpit 406 and made available to all applications 726 executing on the device or to a subset thereof. For example, an application 726 may define a cockpit panel that is available only when the application window 104 is active on the user interface.

The context analyst 716 analyzes the input entered by the user 740, the inputs entered by other users (e.g., in a chat window), the data presented by the executing application 726, and other data sources to identify the history context, which may be used for updating the information presented by one or more panels 714. The history context may be identified based on language processing, of the text entered by the user or provided in the application, to identify one or more subjects, entities, individuals, etc., associated with the application. Other data sources may include news outlets, social media (e.g., Facebook, Twitter), email data (if access is approved by the user 740), etc.

The OS interface 718 interfaces with the operating system 730 to send and receive data. In some example embodiments, the OS 730 is the Windows® OS and the input methods API 732 is the input method editor (IME) and text services framework accessibility framework for accessing the OS input facilities, but other embodiments may use other interfaces to access the input being entered by the user 740.

The cockpit configurator 720 provides facilities to configure the cockpit 406, such as cockpit layouts, panels included in each layout, panel sizes, space used by the cockpit 406 on the user interface, etc. A separate user interface (not shown) is provided by the cockpit configurator 720 to configure the cockpit layout. For example, the user interface may allow the user 740 to drag and drop the panels 714 to the desired location, size the panels 714 by stretching or shrinking their outlines, and identify which panels 714 to present in each layout. In addition, several panels 714 may be configured to occupy the same space and alternate being presented on the cockpit 406 based on the history context.

The operating system 730 may include standard components of an operating system, and not all components are illustrated for simplicity of description. In some example embodiments, the OS 730 includes, at least, the input methods API 732, the clipboard 734, the display driver 736, and I/O component 738. The input methods API 732 provides access to the input entered by the user 740.

It is noted that the embodiments illustrated in FIG. 7 are examples and do not describe every possible embodiment. Other embodiments may utilize different components, combine the functionality of more than one component into a single component, omit some of the components, etc. The embodiments illustrated in FIG. 7 should therefore not be interpreted to be exclusive or limiting, but rather illustrative.

Figure 8:
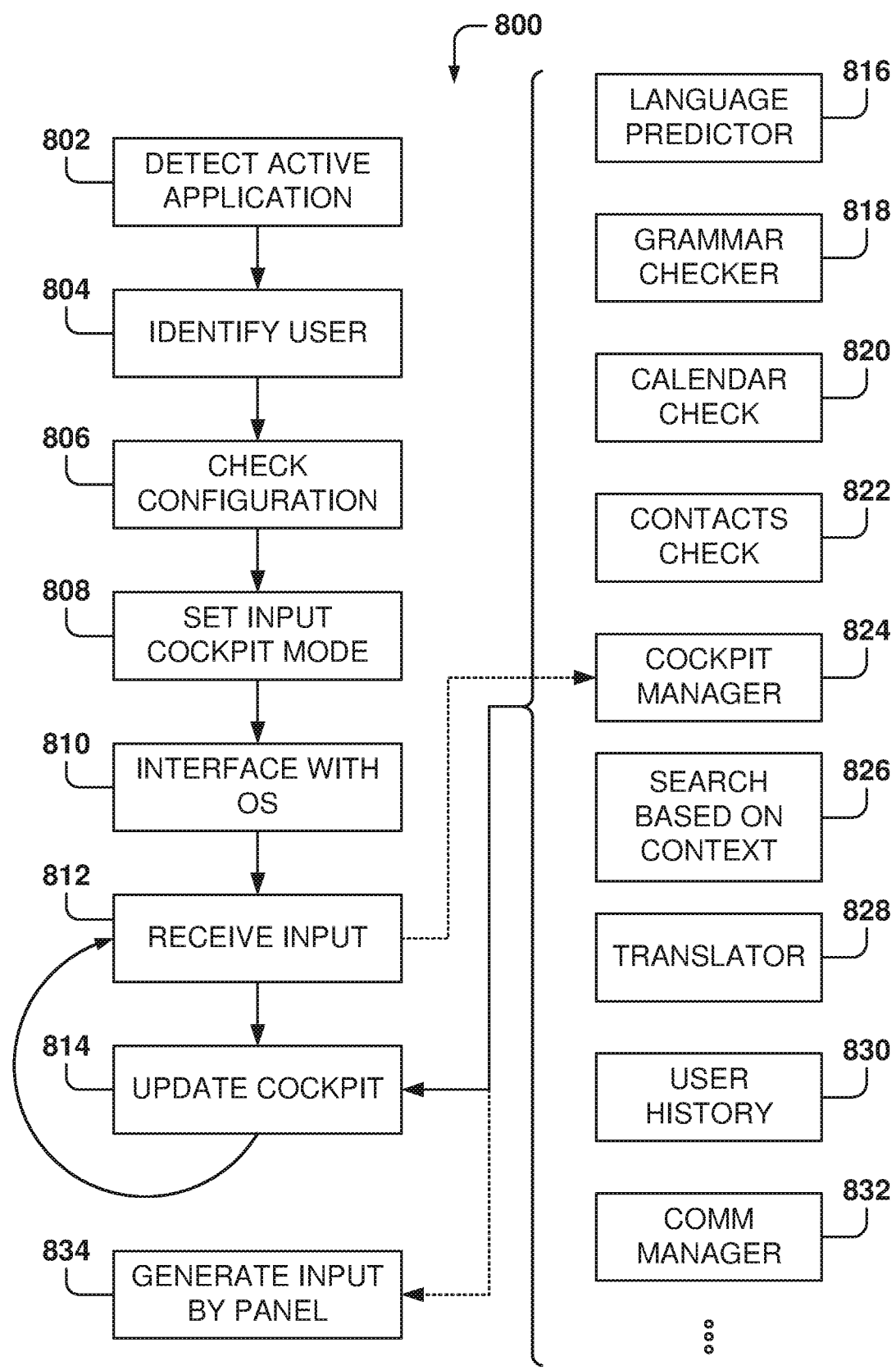
FIG. 8 is a flowchart of a method for implementing the text input cockpit, according to some example embodiments.

FIG. 8 is a flowchart of a method for implementing the text input cockpit, according to some example embodiments. While the various operations in this flowchart are presented and described sequentially, one of ordinary skill will appreciate that some or all of the operations may be executed in a different order, be combined or omitted, or be executed in parallel.

At operation 802, an active application is detected, the active application being configured to receive text input. At operation 804, a user is identified, the user interacting with the detected application.

At operation 806, the cockpit configuration is checked to determine which cockpit is to be presented for the identified user when interacting with the detected application. For example, the cockpit configurator 520 of FIG. 7 may set the desired configuration for the user.

At operation 808, the input cockpit mode is set based on the configuration, the user, and the application. In some example embodiments, the cockpit is presented after the user selects an option in the user interface to present the cockpit, but the cockpit may also be presented based on context without requiring a user to expressly activate the cockpit.

At operation 810, the cockpit interfaces with the operating system to monitor input entered by the user and the application data created by the application.

At operation 812, an input is received and identified by the cockpit. Based on the input, one or more of the panels in the cockpit may be updated as well as the data tracked by the cockpit system. In some example embodiments, the cockpit panels include the language predictor 816, the grammar checker 818, the calendar check 820, the contacts check 822, the cockpit manager 824, the search based on context 826, the translator 828, the user history 830, the communications manager 832, etc.

At operation 814, the cockpit is updated by one or more of the cockpit panels. From operation 814, the method flows back to operation 812 to continue the cycle of receiving input and updating the cockpit.

When the user activates one of the panels, and input may be generated 834 and provided to the operating system as if the user had entered the input. For example, if the user selects a commonly used sentence on one of the panels, the commonly used sentence is entered (minus the characters previously entered by the user, if any).

Figure 9:
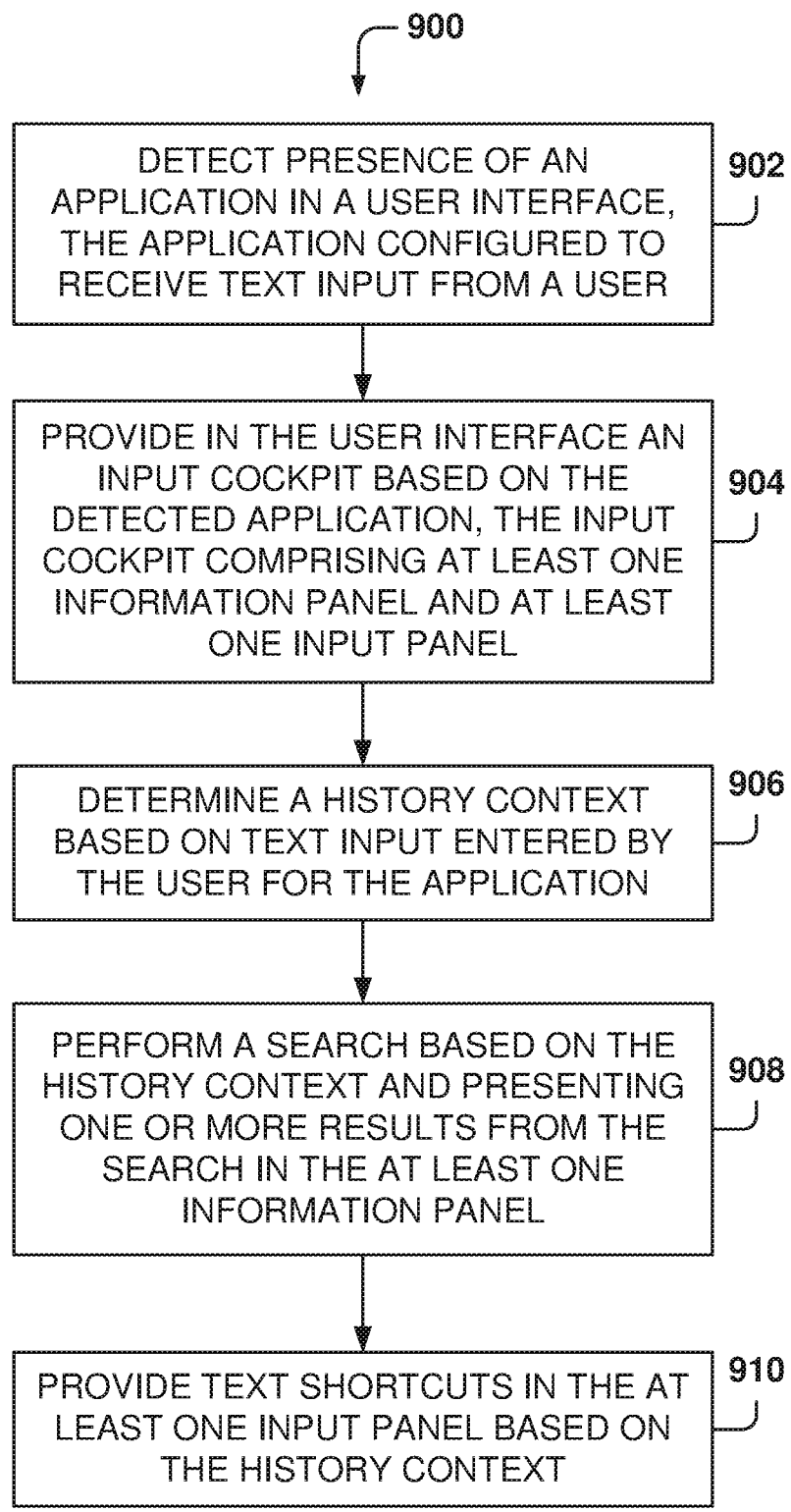
FIG. 9 is a flowchart of a method, according to some example embodiments, for providing text input options in a user interface to accelerate data entry and to provide contextual information to the user.

FIG. 9 is a flowchart of a method 900, according to some example embodiments, for providing text input options in a user interface to accelerate data entry and to provide contextual information to the user. While the various operations in this flowchart are presented and described sequentially, one of ordinary skill will appreciate that some or all of the operations may be executed in a different order, be combined or omitted, or be executed in parallel.

Operation 902 is for detecting, by one or more processors, presence of an application in a user interface, the application configured to receive text input from a user. From operation 902, the method flows to operation 904 where the one or more processors provide, in the user interface, an input cockpit based on the detected application. The input cockpit comprises at least one information panel and at least one input panel.

From operation 904, the method flows to operation 906 where the history context is determined based on at least text input entered by the user for the application. At operation 908, a search is performed, by the one or more processors, based on the history context and one or more results from the search are presented in the at least one information panel.

From operation 908, the method flows to operation 910 where the one or more processors provide text shortcuts in the at least one input panel based on the history context.

In some examples, the text shortcut is an option presented on the at least one input panel, where selection of the text shortcut by the user generates a text input including a plurality of characters for the application.

The history context identifies at least one subject that is based on input entered by the user and based on data associated with the application.

In another example, the application is presented on a window within the user interface, where the input cockpit is presented in the user interface outside of the window of the application.

In some example embodiments, the method 900 further includes detecting additional text input entered by the user, re-determining the history context, and updating at least one information panel or input panel based on the history context and the additional text input.

In some examples, the method 900 further includes providing a first option in the user interface for configuring a layout for the input cockpit, the layout including a selection of panels for inclusion in the input cockpit, a placement of each selected panel, and a size of each selected panel.

In some embodiments, the method 900 further includes providing a second option in the user interface for selecting a layout from a plurality of predefined layouts.

In other embodiments, a first input panel provides text shortcuts that are configurable by the user.

In some examples, a second input panel provides text shortcuts based on user input history.

In some embodiments, a third input panel provides text shortcuts based on the history context, the text shortcuts being associated with one of a name of a business or a geographical location.

In some example embodiments, the search is based on an identified subject derived from the history context.

Figure 10:
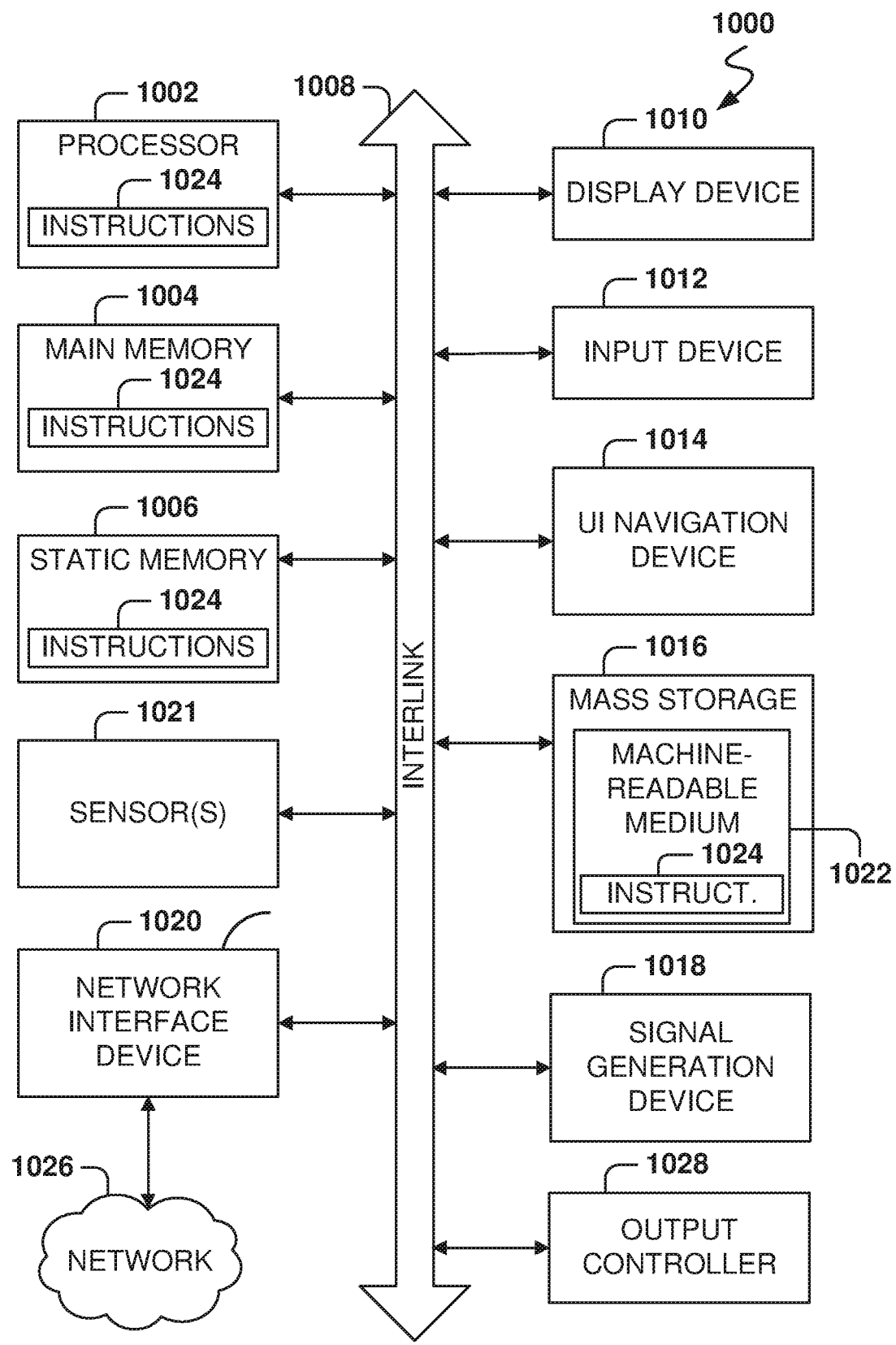
FIG. 10 is a block diagram illustrating an example of a machine upon which one or more example embodiments may be implemented.

FIG. 10 is a block diagram illustrating an example of a machine upon which one or more example embodiments may be implemented. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the mass storage device 1016 may constitute machine-readable media 1022.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks 1026 may include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 1002.11 family of standards known as Wi-Fi®. IEEE 1002.16 family of standards known as WiMax®), IEEE 1002.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   detecting, by one or more processors, presence of an application in a windows user interface, the application configured to receive text input from a user, the application associated with an application window in the windows user interface;
   providing, by the one or more processors, in the windows user interface, an input cockpit based on the detected application, the input cockpit being provided outside the application window in the windows user interface, the input cockpit comprising a plurality of separate panels, the input cockpit comprising an information panel providing contextual information related to activity of the user and an input panel providing input assistance to the application;
   determining, by the one or more processors, a history context that indicates a context of the text input entered by the user in the application;
   automatically performing, by the one or more processors, without an explicit request from the user, a search based on the history context;
   presenting one or more results from the search in the information panel;
   providing, by the one or more processors, text shortcuts in the input panel, the text shortcuts providing suggested inputs for the application based on the history context; and
   providing a first option in the windows user interface for configuring a layout for the input cockpit, the layout comprising a selection of panels for inclusion in the input cockpit, a placement of each selected panel, and a size of each selected panel.

2. The method as recited in claim 1, wherein each text shortcut is an option presented on the input panel, wherein selection of the text shortcut by the user generates a text input comprising a plurality of characters for the application.

3. The method as recited in claim 1, wherein the history context identifies at least one subject that is based on input entered by the user and based on data associated with the application.

4. The method as recited in claim 1, wherein the input cockpit is presented in the windows user interface outside of the application window.

5. The method as recited in claim 1, further comprising:
detecting additional text input entered by the user;
re-determining the history context; and
updating the information panel or the input panel based on the history context and the additional text input.

6. The method as recited in claim 1, further comprising:
providing a second option in the windows user interface for selecting a layout from a plurality of predefined layouts.

7. The method as recited in claim 1, wherein the input cockpit includes a configurable shortcuts panel that provides text shortcuts that are configurable by the user.

8. The method as recited in claim 1, wherein the input cockpit includes a context panel that provides text shortcuts based on the history context, the text shortcuts being associated with one of a name of a business or a geographical location.

9. The method as recited in claim 1, wherein the search is based on an identified subject derived from the history context.

10. The method as recited in claim 1, wherein the history context is based on inputs previously entered by the user in the application window and information provided by the application in the application window.

11. The method as recited in claim 1, wherein the input cockpit includes a locations panel that provides information about a place, a business, or an activity based on the history context.

12. The method as recited in claim 11, wherein the locations panel provides information about a business based on information detected in a calendar of the user without the user having entered input about the business in the application window.

13. A method comprising:
detecting, by one or more processors, presence of an application in a windows user interface, the application configured to receive text input from a user, the application associated with an application window in the windows user interface;
providing, by the one or more processors, in the windows user interface, an input cockpit based on the detected application, the input cockpit being provided outside the application window in the windows user interface, the input cockpit comprising a plurality of separate panels, the input cockpit comprising an information panel providing contextual information related to activity of the user and an input panel providing input assistance to the application;
determining, by the one or more processors, a history context that indicates a context of the text input entered by the user in the application;
automatically performing, by the one or more processors, without an explicit request from the user, a search based on the history context;
presenting one or more results from the search in the information panel;
providing, by the one or more processors, text shortcuts in the input panel, the text shortcuts providing suggested inputs for the application based on the history context;
detecting a resizing operation on the application window; and
modifying a layout of the input cockpit in response to the resizing.

14. A system comprising:
a memory comprising instructions; and
one or more computer processors, wherein the instructions, when executed by the one or more computer processors, cause the one or more computer processors to perform operations comprising:
detecting presence of an application in a windows user interface, the application configured to receive text input from a user, the application associated with an application window in the windows user interface;
providing, in the windows user interface, an input cockpit based on the detected application, the input cockpit being provided outside the application window in the windows user interface, the input cockpit comprising a plurality of separate panels, the input cockpit comprising an information panel providing contextual information related to activity of the user and an input panel providing input assistance to the application;
determining a history context that indicates a context of the text input entered by the user in the application;
automatically performing without an explicit request from the user, a search based on the history context;
presenting one or more results from the search in the information panel;
providing text shortcuts in the input panel, the text shortcuts providing suggested inputs for the application based on the history context; and
providing a first option in the windows user interface for configuring a layout for the input cockpit, the layout comprising a selection of panels for inclusion in the input cockpit, a placement of each selected panel, and a size of each selected panel.

15. The system as recited in claim 14, wherein each text shortcut is an option presented on the input panel, wherein selection of the text shortcut by the user generates a text input comprising a plurality of characters for the application.

16. The system as recited in claim 14, wherein the history context identifies at least one subject that is based on input entered by the user and based on data associated with the application.

17. The system as recited in claim 14, wherein the instructions further cause the one or more computer processors to perform operations comprising:
detecting additional text input entered by the user;
re-determining the history context; and
updating the information panel or the input panel based on the history context and the additional text input.

18. A non-transitory machine-readable storage medium including instructions that, when executed by a machine, cause the machine to perform operations comprising:
detecting presence of an application in a windows user interface, the application configured to receive text input from a user, the application associated with an application window in the windows user interface;
providing, in the windows user interface, an input cockpit based on the detected application, the input cockpit being provided outside the application window in the windows user interface, the input cockpit comprising a plurality of separate panels, the input cockpit comprising an information panel providing contextual information related to activity of the user and an input panel providing input assistance to the application;
determining a history context that indicates a context of the text input entered by the user in the application;
automatically performing without an explicit request from the user, a search based on the history context;
presenting one or more results from the search in the information panel;

providing text shortcuts in the input panel, the text shortcuts providing suggested inputs for the application based on the history context; and providing a first option in the windows user interface for configuring a layout for the input cockpit, the layout comprising a selection of panels for inclusion in the input cockpit, a placement of each selected panel, and a size of each selected panel.

19. The machine-readable storage medium as recited in claim 18, wherein each text shortcut is an option presented on the input panel, wherein selection of the text shortcut by the user generates a text input comprising a plurality of characters for the application.

20. The machine-readable storage medium as recited in claim 18, wherein the history context identifies at least one subject that is based on input entered by the user and based on data associated with the application.

21. The machine-readable storage medium as recited in claim 18, wherein the machine further performs operations comprising:

detecting additional text input entered by the user;

re-determining the history context; and updating the information panel or the input panel based on the history context and the additional text input.

\* \* \* \* \*